United States Patent [19]
Li et al.

[11] Patent Number: 5,890,002
[45] Date of Patent: Mar. 30, 1999

[54] SYSTEM AND METHOD FOR BUS MASTER EMULATION

[75] Inventors: Jay Li, Milpitas; Mark Williams, San Jose, both of Calif.

[73] Assignee: OPTi Inc., Milpitas, Calif.

[21] Appl. No.: 775,174

[22] Filed: Dec. 31, 1996

[51] Int. Cl.⁶ .................................................. G06F 13/28
[52] U.S. Cl. .......................... 395/733; 395/842; 395/527
[58] Field of Search .................................. 395/527, 842, 395/843, 733, 739, 500, 309

[56] References Cited

U.S. PATENT DOCUMENTS

| | | | |
|---|---|---|---|
| 5,414,815 | 5/1995 | Schwede | 395/846 |
| 5,664,224 | 9/1997 | Davis | 395/842 |
| 5,668,957 | 9/1997 | Davis et al. | 395/309 |
| 5,708,815 | 1/1998 | Poisner | 395/736 |

*Primary Examiner*—Meng-Ai T. An
*Assistant Examiner*—Rupal D. Dharia
*Attorney, Agent, or Firm*—Fliesler Dubb Meyer & Lovejoy LLP

[57] ABSTRACT

A system and method in accordance with the invention allows the emulation of a DMA transfer between a device such as a CD-ROM which is incapable of a bus-mastering mode of operation (e.g., a DMA transfer) and a memory. Following receipt of an interrupt request, a system in accordance with the invention generates an I/O access cycle to the device, retrieves data and stores the data in a buffer. Following data retrieval, the system transfers the data to host memory. Once data is transferred to host memory, an interrupt is generated to the host processor. Thus, host processor resources are not required to perform a data transfer with devices unable to become bus-masters.

13 Claims, 5 Drawing Sheets

SYSTEM AND METHOD FOR BUS MASTER EMULATION

BACKGROUND OF THE INVENTION

1. Field of the Invention

The invention relates to data transfers by system bus devices, and particularly to transfers by devices incapable of a bus master mode of operation.

2. Background Art

The IBM PC AT computer architecture has become industry standard architecture for personal computers, and is typically built around a CPU such as an 80286, 80386, 80486, or 80586 (Pentium®) microprocessor manufactured by Intel Corporation. The CPU is coupled to a host (local) bus, capable of performing memory accesses and data transfers at high rates of speed (i.e., on the order of 10–66 MHz). The host bus generally includes 16, 32, or 64 data lines, a plurality of address lines, and various control lines. For present purposes the following signals on the host bus are important:

| Signal Name | Signal Description |
| --- | --- |
| HD[63:0] | Host Bus Data Lines. |
| HA[31:3] | Host Bus Address Lines. |
| BE[7:0]# | Byte enables 7 through 0: Selects the active byte lanes on HD[63:0]. |
| INTR | Interrupt Request: INTR is driven to signal the processor that an interrupt request is pending and needs to be serviced. |
| M/IO# | Memory/Input-Output: M/IO#, defines processor bus cycles along with D/C#, and W/R#. |
| D/C# | Data/Control: D/C# defines processor bus cycles along with M/IO# and W/R#. |
| W/R# | Write/Read: W/R# defines processor bus cycles along with M/IO# and D/C#. |
| ADS# | Address Strobe: The processor asserts ADS# to indicate that a new bus cycle is beginning |
| BRDY# | Burst Ready: BRDY# indicates that the system has responded in one of three ways: 1) Valid data has been placed on the processor data bus in a response to a read, 2) Processor write data has been accepted by the system, or 3) the system has responded to a special cycle. |
| STPCLK# | Stop Clock: this signal is connected to the STPCLK# input of the processor. It causes the processor to get into the STPGNT# state. |

The typical IBM PC AT-compatible computer also includes a system bus, sometimes referred to as an I/O bus. Such a system bus is used to interface communications between a host CPU and a peripheral device, or communications between peripheral devices and host memory. The system bus is coupled to the host bus via certain interface circuitry. The system bus includes generally 8, 16, or 32 data lines, a plurality of address lines, as well as control lines.

One of the most commonly used system buses is the industry standard architecture (ISA) bus. The ISA bus was adopted by several computer industry groups in the 1980's to create a standard to permit the development of compatible add-on cards in a reasonable and consistent fashion. The ISA bus operates at approximately 8 Mhz and includes 8 or 16 data lines, distinct address lines, as well as distinct control and command lines.

The various signals on the ISA bus are well specified and known in the industry. General information on the ISA bus can be found in Solari, "AT Bus Design" (San Diego, Annabooks, 1990), incorporated by reference herein. For present purposes, the following ISA signals are important:

| Signal Name | Signal Description |
| --- | --- |
| SA[23:0] | 24 address lines. |
| BALE | Bus address latch enable line. BALE is an active high signal asserted to indicate when the SA address, AEN and SBHE# lines are valid. BALE remains asserted throughout ISA master and DMA cycles. |
| SBHE# | System byte high enable. When SBHE# is active, it indicates that a byte is being transferred on the upper byte (SD[15:8]) of the data bus. |
| AEN | Address enable line. AEN is asserted during DMA cycles to prevent I/O slaves from misinterpreting DMA cycles as valid I/O cycles. When active, AEN informs I/O resources on the ISA bus that a DMA transfer is occurring. |
| SD[15:0] | 16 data lines. |
| MEMR# | Read request lines to a memory resource on the ISA bus. |
| MEMW# | Write request lines to a memory resource on the ISA bus. |
| IOR# | Read request line to an I/O resource on the ISA bus. Also called IORC# or IORD#. |
| IOW# | Write request line to an I/O resource on the ISA bus. Also called IOWC# or IOWR#. |
| M16# | Memory chip select 16. Asserted by an addressed memory resource on the ISA bus if the resource can support a 16-bit memory access cycle. Also called MEMSC16#. |
| IO16# | I/O chip select 16. Asserted by an addressed I/O resource on the ISA bus if the resource can support a 16-bit I/O access cycle. Also called IOCS16#. |
| NOWS# | Synchronous Ready line. Also sometimes called 0WS#, SRDY# or ENDXFR#. Activated by an addressed memory resource to indicate that it can support a shorter-than-normal access cycle. |
| IOCHRDY | I/O channel ready line. If this line is deactivated by an addressed I/O resource, the cycle will not end until it is reactivated. Also sometimes called CHRDY. |
| INTRQ(15, 14,12:9,7:3) | Interrupt request lines. |
| DMARQ(7:5,3:0) | DMA Request lines from I/O resource on ISA bus. |
| DACK(7:5,3:0) | DMA Acknowledge lines. |
| BCLK | ISA bus clock signal. |
| XD[7:0] | XD bus lines. ISA status signals. |

Recently, efforts have been made to develop other bus protocols for PC AT-compatible computers with the goals of reducing the size of PC AT-compatible computers as well as continued industry standardization. These efforts have included the development of the PCI bus, which has been developed to establish a new industry standard for bus architectures, particularly those interfacing with high bandwidth functions. The PCI bus is described in detail in "PCI Local Bus Specification", Revision 2.1 (Portland, Oreg., PCI Special Interest Group, 1995), incorporated by reference herein. For present purposes, the following PCI signals are important:

| Signal Name | Signal Description |
|---|---|
| AD[31:0] | PCI Address and Data: AD[31:0] are bidirectional address and data lines for the PCI bus. |
| FRAME# | Cycle Frame: FRAME# is driven the current bus master to indicate the beginning and duration of an access. FRAME# is asserted to indicate that a bus transaction is beginning. While FRAME# is asserted, data transfers continue. When FRAME# is deasserted, the transaction is in the final data phase or has completed. |
| IRDY# | Initiator Ready: IRDY# indicates the initiating agent's (the bus master's) ability to complete the current data phase of the transaction. IRDY# is used in conjunction with TRDY#. A data phase is completed on each clock that both IRDY# and TRDY# are sampled asserted. During a write, IRDY# indicates that valid data is present on AD[31:0]. During a read, it indicates the master is prepared to accept data. |
| TRDY# | Target Ready: TRDY# indicates the target agent's (selected device's) ability to complete the current data phase of the transaction. TRDY# is used in conjunction with IRDY#. A data phase is asserted. During a read, TRDY# indicates that valid data is present on Ad[31:0]. during a write, it indicates the TRDY# is proper. |
| DEVSEL# | Device Select: When actively driven, DEVSEL# indicates the driving device has decoded its address as the target of the current access. |
| STOP# | Stop: STOP# indicates that the current target is requesting a master to stop the current transaction. |
| PCICLK | Master PCI clock. |
| CLKRUN# | Clock Run: CLKRUN# is an I/O sustained tristate signal used by the central resource (the host) to request permission to stop or slow the PCICLK. |

Despite PCI bus development, because the PCI bus was designed primarily to support high-end peripherals (i.e., supporting speeds of up to 66 Mhz for 64-bit data), it is not as economical to manufacture low-end peripherals for the PCI-bus as it is for the older, slower ISA-bus. Thus both PCI-type devices and ISA-type devices are commonly produced and computer systems must be developed which have the interfaces to support both PCI-type and ISA-type devices.

Specific devices coupled to the system bus are often peripheral storage units such as disk drives and CD-ROM drives. Many of these devices are IDE (integrated device electronics) devices meaning that they have a built-in controller which allows them to directly interface with the system bus, often an ISA bus. To allow compatibility with various IDE devices and to develop industry standardization and systems, the AT Attachment-3 Interface Specification (ATA-3) has been developed by various industry groups. ATA-3 is described in detail in "Information Technology— AT Attachment-3 Interface (ATA-3), Revision 5 (released for comment and review by ASC X3T10 Technical Committee, October 1995), incorporated by reference herein. For present purposes, the following IDE signals (as defined by ATA-3) are important:

| Signal Name | Description |
|---|---|
| DA[2:0] | IDE address lines: asserted by host to access device. |
| DD[15:0] | IDE data: bidirectional data lines |
| DRD# | Read request line to IDE resource |
| DWR# | Write request line to IDE resource. |
| INTRQ | Interrupt request. Asserted by IDE device when data is ready for transfer. |
| DMARQ | DMA request. Asserted by IDE device when IDE device is ready for a DMA transfer. |
| DMACK# | DMA acknowledge. |
| DCS1#, DCS3# | Chip select signals for selecting control block registers in IDE device. |
| DCHRDY | Channel ready: negated during an access cycle when device is not ready to respond to a data transfer request. |

Generally, when a host system (which may include a processor, a memory, and interface circuitry) requires data from an IDE drive, the host will first write command parameters (e.g., sector count, sector number, head, etc.) and other command codes to device registers notifying the device of a request for data. When data is available for transfer to or from the device, the device asserts an interrupt (INTRQ) to the host system. Upon receipt of an interrupt, the host processor initiates an access cycle to transfer data to or from the device. Such mode of data transfer is often referred to as a "programmed I/O" (or "PIO") data transfer because of use made of programmable registers. Other methods of I/O transfer without using programmable registers are also known in the art. Thus, as referred to hereinafter, a "PIO" mode of data transfer is any I/O cycle requiring host processor resources throughout the access cycle. Generally the host processor remains actively involved in the PIO access cycle until it is completed, e.g., by waiting to receive data and then transferring the data to memory. More detailed information regarding PIO data transfers can be found in ATA-3.

Because of the high demand for host processor resources during an access cycle, many IDE drives are also "bus masters", meaning that the device itself can initiate and control a data transfer cycle on the system bus with little to no host processor participation. Often such "bus master" control occurs through DMA (direct memory access) cycles, which allow a device to transfer data to or read data from the host memory directly without host processor involvement.

Generally for a DMA transfer, when a host system requires data from a bus mastering IDE device, the host will first write command parameters and other command codes to IDE device registers, thereby notifying the device of a request for a data transfer, in a manner similar to that done for IDE devices using a PIO mode of transfer. However, rather than asserting an interrupt to the host processor, the bus-mastering IDE device will assert a DMA request signal (DMARQ), which is not transferred to the host processor. Rather the DMARQ signal is received by the interface circuitry and indicates that the IDE device is attempting to assert ownership of the bus. Upon receipt of a DMA acknowledge (DMACK) signal from the interface circuitry, indicating that the bus is available for ownership by the device, the IDE device transfers data to host memory via a DMA data transfer cycle. No host processor resources are utilized during a DMA data transfer. More detailed information regarding DMA data transfers to and from IDE devices can be found in ATA-3.

Some devices, however, particularly CD-ROM drives, do not have bus-mastering capability. These devices have no option but to transfer data to and from the host via a PIO data transfer, consuming valuable host processor resources. Unfortunately, CD-ROM devices use more host processor bandwidth in a data transfer than any other type of system I/O device currently available. Thus a data transfer involving a CD-ROM drive will consume considerable CPU resources, causing slower system performance.

As applications on CD-ROM and other high-bandwidth devices increase, such performance compromises are becoming more and more unacceptable. While some CD-ROM drives are beginning to be designed with bus mastering capability, the vast majority lack this ability. Thus, a device for improving the performance of computer systems during a data transfer involving a non-bus-mastering device is needed.

SUMMARY OF INVENTION

In order to reduce demand for host processor resources when a data transfer to a device incapable of a bus-master mode of operation is required, the following steps in accordance with the invention are performed. When a non-bus-master device is ready to transfer data, the device will generate an interrupt request signal. Rather than interrupting the host processor, a system in accordance with the invention generates one or more I/O cycles and retrieves data from the non-bus-master device upon assertion of the interrupt request signal. The data is stored in a buffer. Subsequently, a system in accordance with the invention transfers the stored data to the host memory. Once the data transfer to memory is complete, a system in accordance with the invention interrupts the host processor.

Such a system and method is advantageous in that host processor resources are not required for the entire data transfer. The data transfer appears to the host processor to be a DMA transfer. Thus, host processor resources can be directed elsewhere.

BRIEF DESCRIPTION OF THE FIGURES

The present invention is described with respect to particular exemplary embodiments thereof and reference is accordingly made to the drawings (which are not necessarily drawn to scale), wherein like reference numbers denote like parts, in which.

DETAILED DESCRIPTION

Figure 1:
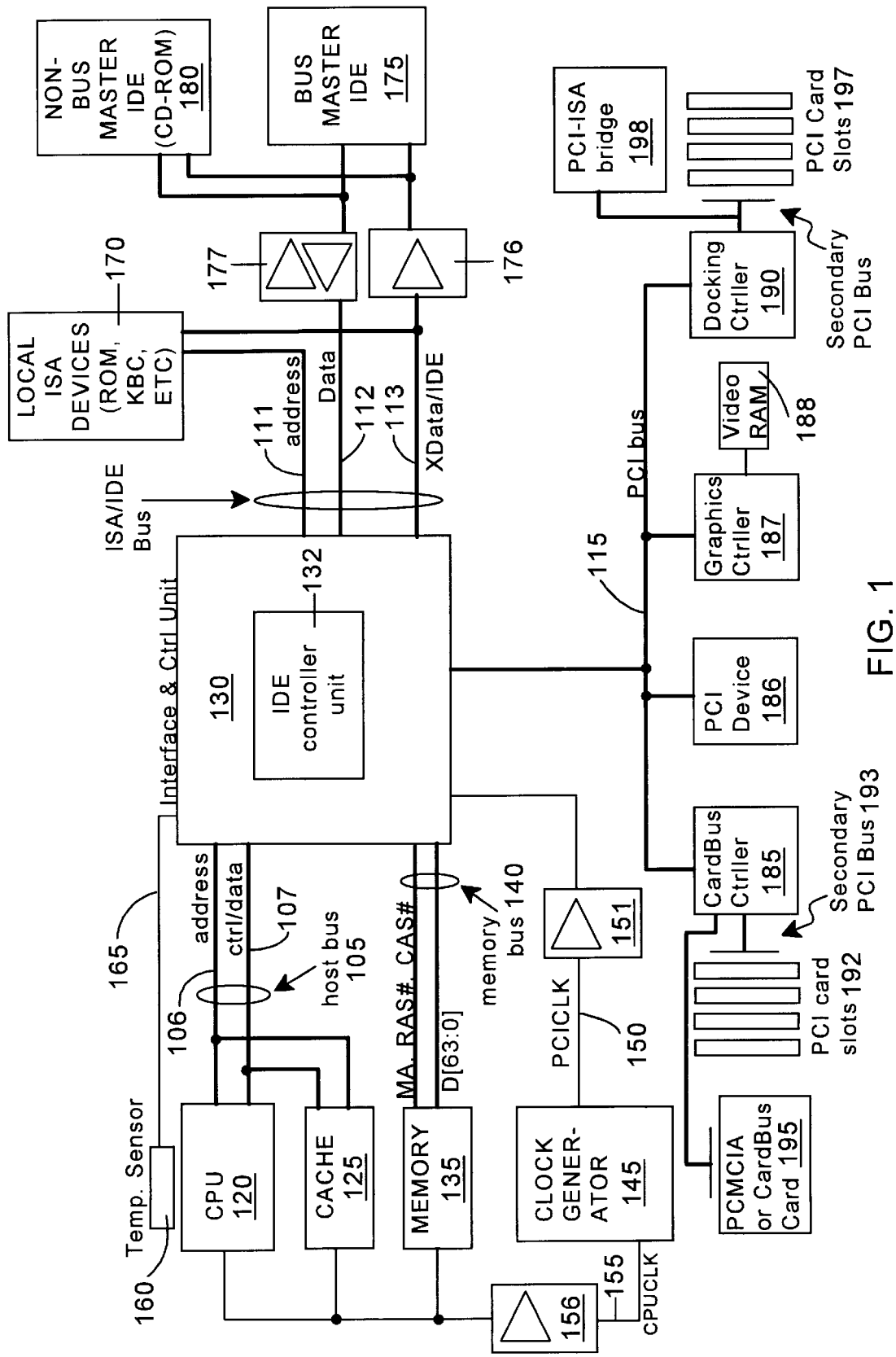
FIG. 1 is a schematic block diagram of a system which utilizes an embodiment of the invention.

A system 100 which may incorporate the present invention is shown in FIG. 1. It comprises a host bus 105, an ISA bus 110, and a primary PCI bus 115.

The host bus 105 includes address lines 106 and control/data/status lines 107. The ISA bus 110 includes address lines 111, 16-bit data lines 112, X data lines 113, as well as various control lines (not shown). The primary PCI bus 115, includes address, data and control/status lines.

A processor 120 (such as Intel's 80586 Pentium®) is coupled to address, data, and control/status lines of host bus 105. Host bus 105 is further coupled to cache memory 125. Cache memory 125 may be synchronous L2 (level 2) cache in one embodiment.

Host bus 105 is further coupled to interface and control unit 130. Interface and control unit 130 includes IDE controller unit 132. In one embodiment, interface and control unit 130 is a chipset.

Interface and control unit 130 is coupled to memory unit 135 via memory bus 140 which provides memory address, RAS#, CAS#, and data information between interface and control unit 130 and memory unit 135. Memory unit 135 may be composed of EDO or synchronous DRAM in various embodiments.

Clock generator unit 145 provides a PCI clock signal (PCICLK) on line 150 via buffer 151 to interface and control unit 130. Clock generator unit 145 further provides a CPU clock signal (CPUCLK) on line 155 via buffer 156 to memory unit 135, if synchronous DRAM is used, and to processor 120.

Temperature sensor circuit 160 is coupled to interface and control unit 130 via line 165.

Several devices are coupled to interface and control unit 130 via ISA bus 110. These devices include local ISA devices 170, such as BIOS ROM, keyboard controller (KBC), etc. Further, bus mastering IDE devices 175 as well as non-bus mastering IDEs 180 (such as CD-ROM) are coupled to interface and control unit 130 via ISA bus 110, buffer 176 and bidirectional transceiver 177. IDE signal lines are multiplexed with ISA XData lines in the embodiment shown in FIG. 1.

PCI bus 115 is also coupled to interface and control unit 130. Several devices are coupled to PCI bus 115, including a card bus controller 185, which may be an 82C824 produced by OPTi, Inc. of Milpitas, Calif., a graphics controller 187, which may be a 92C178, produced by OPTi, Inc., and a docking controller 190, which may be an 82C814 produced by OPTi, Inc. Coupled to graphics controller 187 is video RAM card 188. Other PCI devices 186, such as a PCI-based super I/O unit, may also be coupled to PCI bus 115 in other embodiments.

CardBus controller 185 acts as a bridge to secondary PCI bus 193. Secondary PCI bus 193 couples additional PCI slots 192 to the system. Additionally, CardBus controller 185 can also be coupled via line 194 to a PCMCIA or other CardBus card 195.

In like manner, docking controller 190 is coupled to a secondary PCI bus 196, which couples additional PCI slots 197 to the system. In one embodiment, docking controller 190 is also coupled to PCI-to-ISA bridge 198.

In order to alleviate the consumption of processor resources for a data transfer to host system memory involving a non-bus-mastering device (e.g., a CD-ROM device), a system in accordance with the invention executes a data transfer from a non-bus-mastering device and emulates, as far as the host processor is concerned, a bus mastering device. In this manner, data can be transferred to host memory while the host processor has little to no involvement in the transfer and can thus direct its resources elsewhere.

Figure 2:
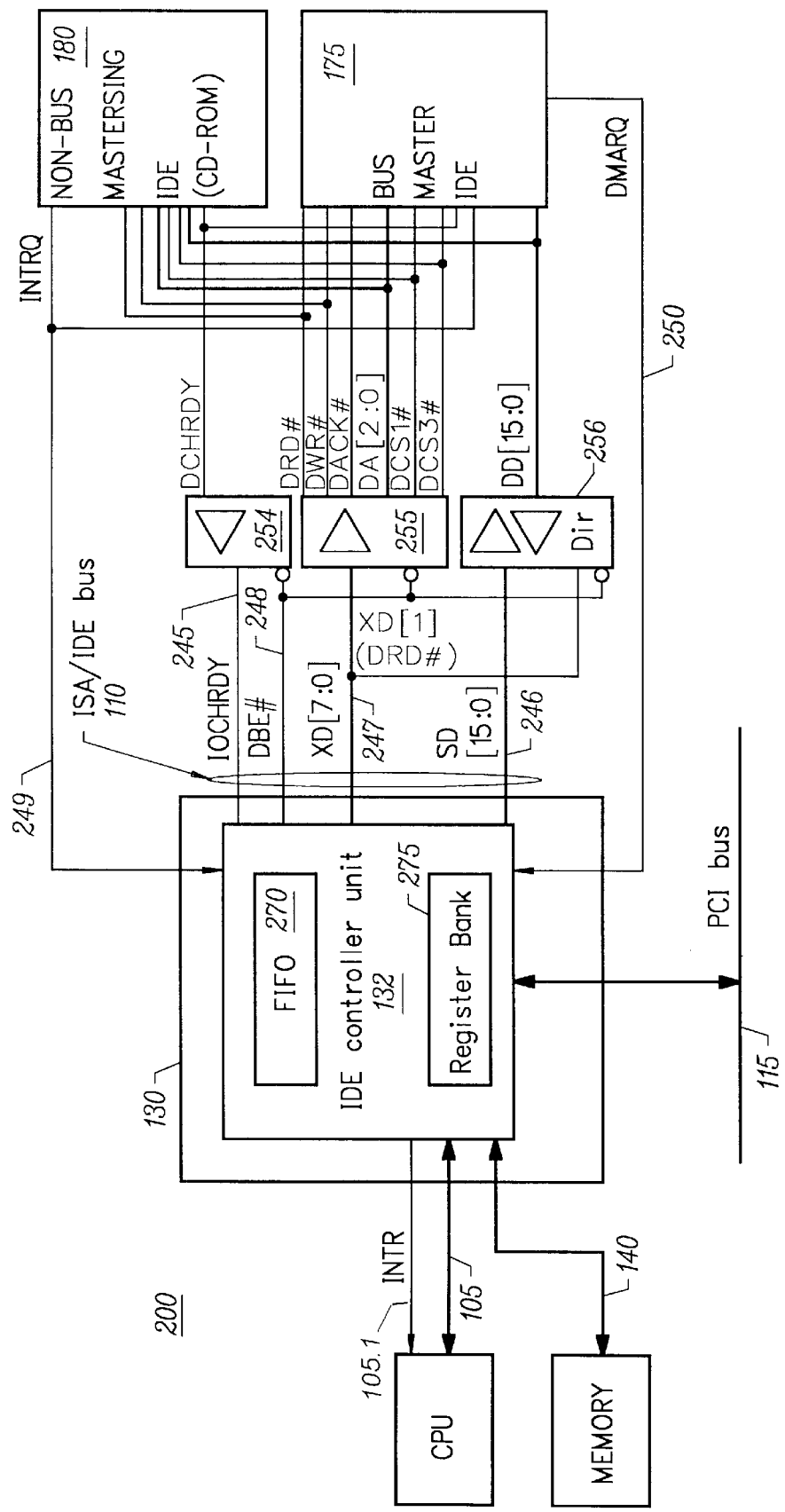
FIG. 2 is a schematic block diagram of a system in accordance with the invention.

A system 200 in accordance with the invention is shown in FIG. 2. Processor 120 is coupled to IDE controller unit 132 via host bus 105. Host bus 105 includes interrupt line 105.1, which is shown separate from bus 105 for illustration purposes only. Host memory 135 is also coupled to IDE controller 132 via bus 140, which includes address, data, and various control/status lines.

In the embodiment shown in FIG. 2, IDE drives 175 and 180 are each coupled to IDE controller 132 through various signal lines including: XD[7:0], SD[15:0] 246, IOCHRDY 245, INTRQ 249, and DMARQ 250. Each of the signal lines 245–247 are buffered through buffers 254–256. Some embodiments of the invention may not require buffers 254–256 particularly those where drive isolation is not an issue (e.g., a notebook system with few ISA-bus devices). IDE specific signals are multiplexed onto ISA XD[7:0] lines 247. DBE# 248 acts as a multiplexing signal to choose either an XData or IDE function for bus 110. When an IDE drive is being accessed, the signals carried on bus 247 include: DRD#, DWR#, DACK#, DA[2:0], CS1#, and CS3#. Other embodiments of the invention provide IDE data between unit 132 and IDE devices without multiplexing. When buffered to an IDE device, IOCHRDY 245 is referred to as DCHRDY and SD[15:0] is referred to as DD[15:0].

IDE controller 132 is further coupled to PCI bus 115.

Figure 3:
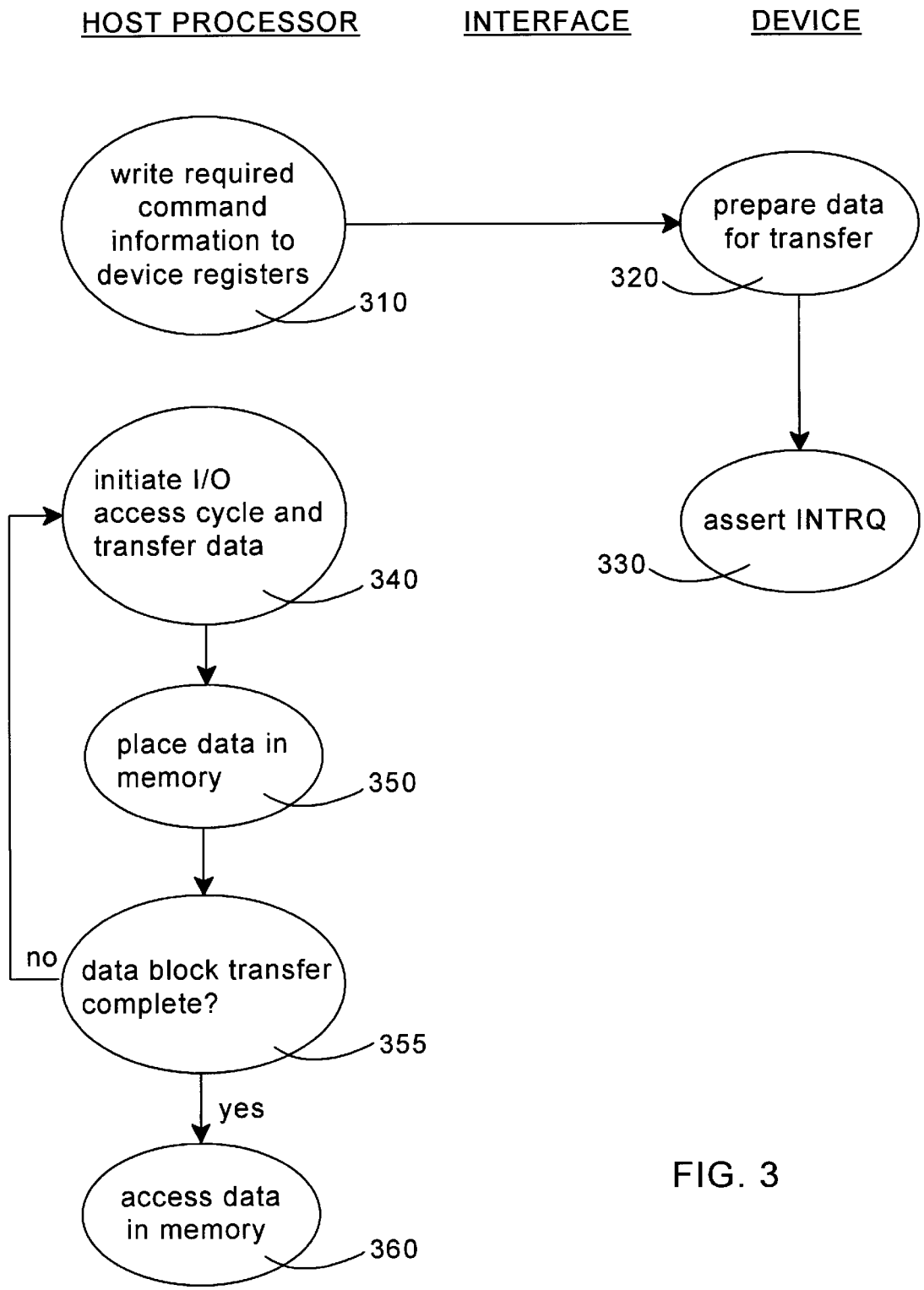
FIG. 3 is a flow diagram showing the steps occurring for a PIO read cycle.

With reference to FIGS. 2 and 3, to engage in a standard (PIO) data transfer, the host processor system, writes information to IDE device internal registers, including command, status, and other registers, step 310 (in FIG. 3). These registers store information regarding the head, starting sector number, and number of sectors to be accessed as well as a command code which initiates the IDE device data transfer routines. These registers can be addressed and written/read to/from using the chip select (DCS1#, DCS3#) and address (DA[2:01]) lines. The IDE device then prepares to transfer data, step 320, and when ready, the IDE device 180, asserts an interrupt signal, INTRQ, on line 249, which is passed without significant processing by IDE controller unit 132 to the host processor, step 330. The host processor subsequently initiates and is involved in multiple I/O access cycles step 340.

In general, to initiate an access cycle and transfer data, step 340, the host processor asserts an address on the host bus 105 address lines, an M/I0# signal indicating an I/O cycle, and a W/R# signal. When interface and control unit 130 receives the cycle from the processor it performs necessary cycle conversions, and (after posting it to and positively claiming the cycle from the PCI bus, as is generally known in the art for directing bus cycles in a multi-bus scheme) directs the cycle to the ISA/IDE bus 110. Data is transferred between the host processor 120 and the device. The host processor then transfers the data to host memory 135, step 350. This step repeats via step 355 until the entire data block is transferred. After the data block is in memory, host processor 120 may access and manipulate the data, step 360.

Throughout the PIO transfer cycle, the interface and control unit 130, including IDE controller 132, acts primarily as a conduit, reformatting the information for the appropriate bus, but not storing or manipulating the data. The host processor 120, however, is actively involved in the data transfer process (steps 340, 350, and 355) and cannot engage in any other activities until the transfer is complete.

FIG. 3 is used to describe a PIO read cycle. It will be understood by those of skill in the art that a write cycle is performed in a similar fashion. More detailed information regarding IDE data transfers can be found in AT Attachment-3 Interface (ATA-3), incorporated by reference herein as well as Solari, AT Bus Design 1990 (available from Annabooks, 12145 Alta Carmel Court, Suite 250, San Diego, Calif. 92128), and incorporated herein by reference.

Because many data transfers are transfers directly to or from local memory without an immediate need for CPU processing, many IDE devices are "bus masters", capable of direct memory access (DMA) transfers. DMA transfers do not require host processor resources during their execution.

Figure 4:
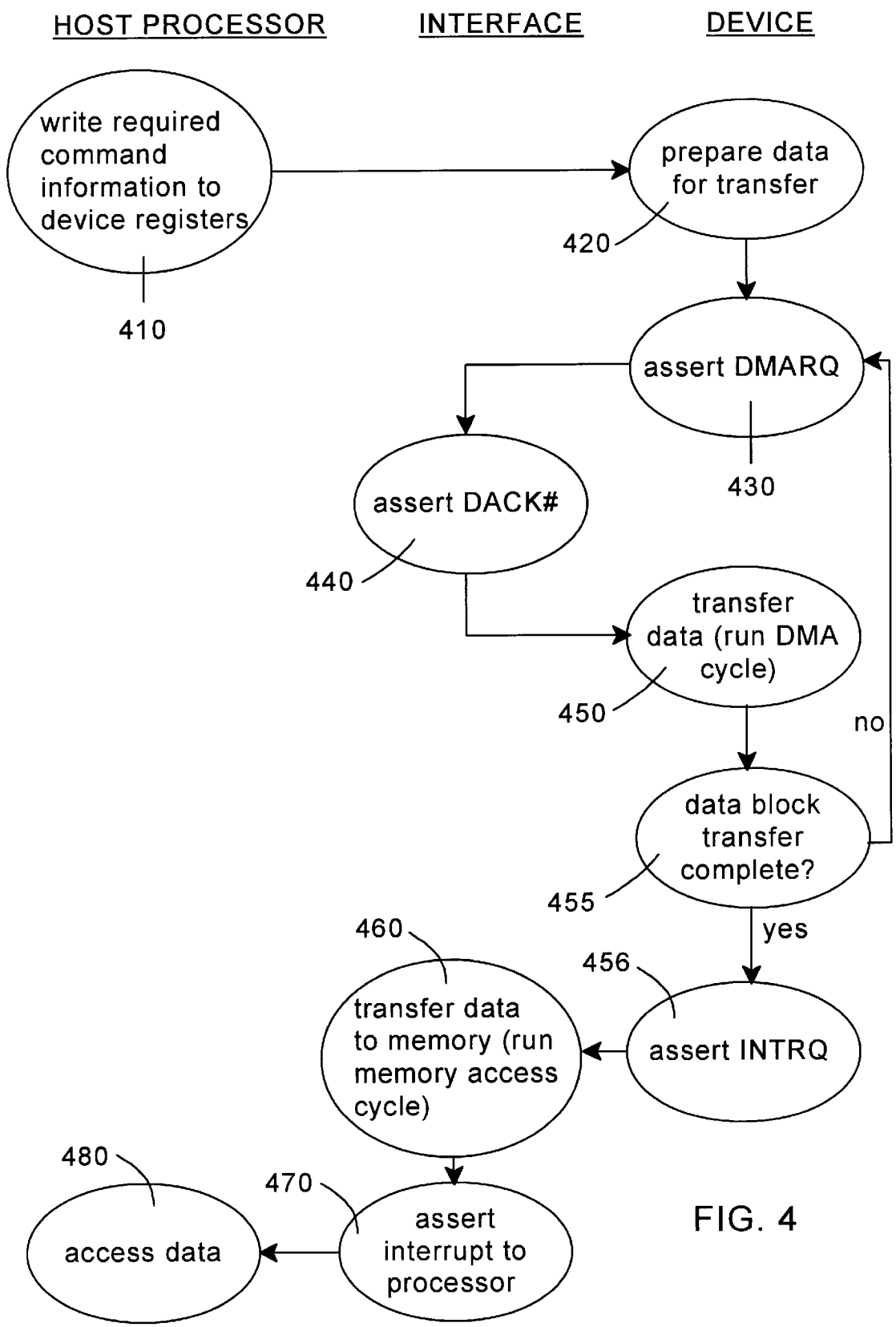
FIG. 4 is a flow diagram showing the steps occurring for a DMA read cycle.

A DMA read cycle is described with respect to FIG. 4. In step 410, the host processor first specifies that a data transfer is to occur by writing the address and size of the data request into internal IDE device registers, similarly to that done for PIO transfers. That is, information specifying the head, starting sector number, and number of sectors to be accessed as well as a command code which initiates the IDE device data transfer routines is written to the IDE device.

After the IDE device has prepared for a data transfer, step 420, and data is available for transfer, the device asserts a DMA request signal (DMARQ) 250 to the IDE controller 132, step 430. DACK# is asserted by IDE controller 132, step 440. In step 450 during a read cycle (data being transferred to memory 135), the IDE device 175 executes DMA transfer cycles to transfer a data block to IDE controller 132, which directs the data in the data block to a FIFO 270. After each cycle, if a full data block has not been transferred, step 455, the process returns to step 430. Once it is determined that all data has been transferred to IDE controller unit 132, step 455, then an INTRQ signal is asserted as line 249 to the IDE controller unit 132, step 456. The IDE controller 132 then transfers the buffered data to host memory 135, step 460. Transfers to host memory 135 are performed with a memory access cycle, as is generally known to those of skill in the art. Once data is in memory, IDE controller will assert an interrupt on line 105.1 to host processor 120 indicating that data is available in host memory 135, step 470. The host processor can then access the data, step 480. While FIG. 4 is discussed with respect to a DMA read cycle, those of skill in the art will understand that a write cycle is performed in a similar manner.

Figure 5:
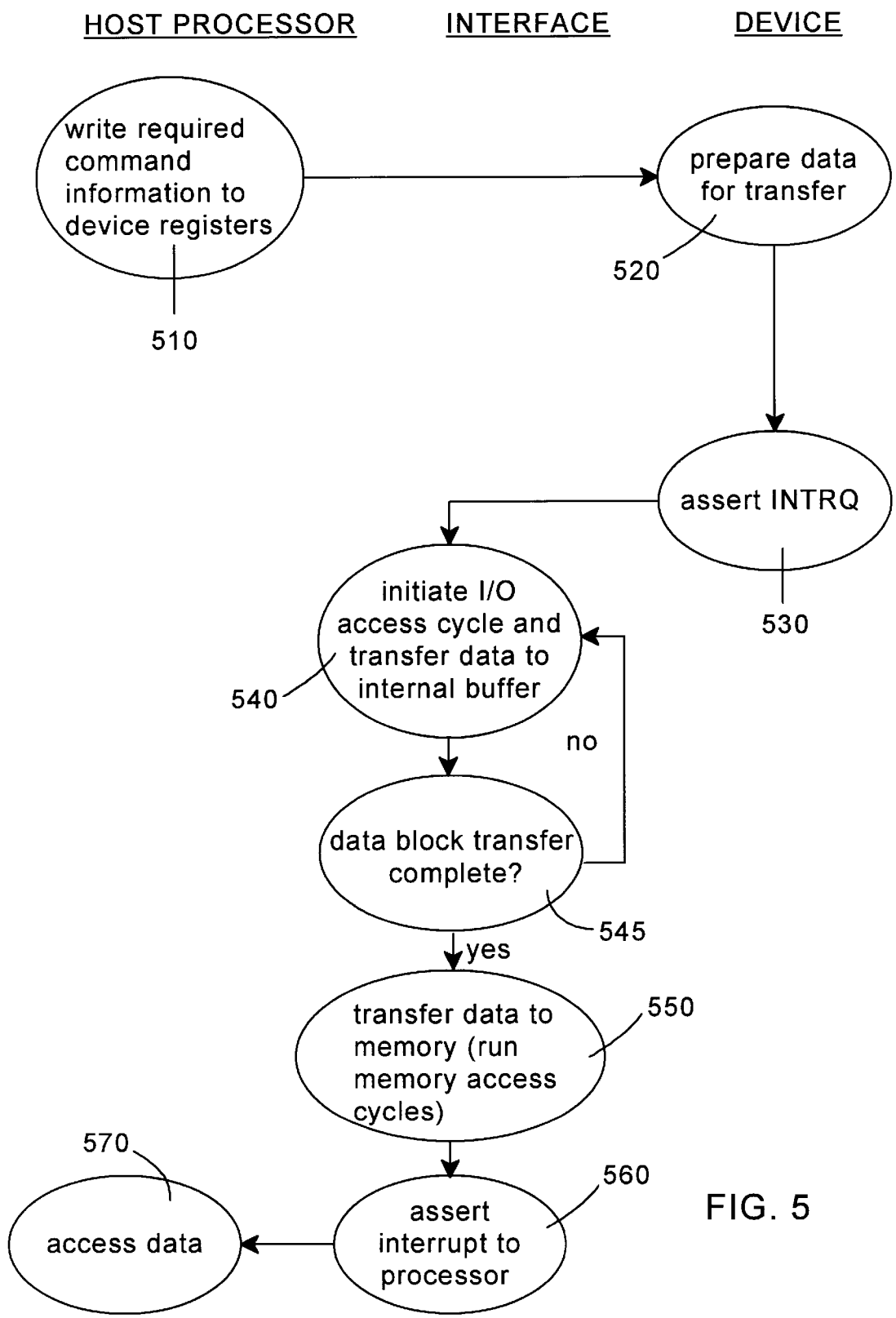
FIG. 5 is a flow diagram showing steps in accordance with one embodiment of the invention.

In order to avoid consuming CPU resources for a data transfer to host memory 135 when a non-bus-mastering IDE device 180, such as a CD-ROM is involved, a system in accordance with the invention emulates bus-mastering devices by allowing the access and storage of data in a host memory without host processor intervention. To do so, the IDE controller 130, in one embodiment of the invention, maintains a register bank 275 which indicates for each IDE device (e.g., 175 and 180) whether the device is capable of a bus-mastering mode of operation (e.g., DMA transfers). Referring to FIG. 5, after the host processor indicates that a data transfer is required, step 510, i.e., by writing size and location of data and other command codes to the IDE drive internal registers, then if a device is not capable of DMA transfers as indicated by registers 275, the following steps are performed for a read cycle.

Data is prepared by the IDE device 180 for a data transfer, step 520. The IDE device 180 will then assert an interrupt INTRQ 249, step 530, as it would for a PIO transfer, indicating that the device 180 is ready to transmit data. When the IDE controller 132 receives the interrupt, however, it does not pass the interrupt to the host processor as it would do in a PIO mode of transfer. Rather, upon receipt of INTRQ, the IDE controller 132 acts as bus master and runs I/O access cycles to the IDE drive 180 to retrieve data, step 540. Such I/O access cycles are similar to the access cycle that would be run from a host processor initiated I/O cycle. The IDE controller, however, stores the retrieved data in a FIFO 270 or other buffer. In Step 545, the IDE controller determines if more data is required to be transferred. If yes, the process returns to step 540. If no, the buffered data will then be transferred from FIFO 270 to host memory 135 via memory access cycles initiated by the IDE controller, in a manner known to those of skill in the art, step 550. Once the data is transferred into memory 135, the host processor 120 can be interrupted via line 105.1, step 560, indicating that data is available in memory. The host processor may then access the data, step 570. I/O access cycles and memory access cycles are generally known in the art. However, more detailed information regarding these cycles can be found in Solari, AT Bus Design, incorporated by reference herein.

While FIG. 5 is used to describe to a read cycle performed in accordance with the invention, it is to be understood the write cycles could also be performed using similar techniques. For instance, the host processor would write various command data to the IDE device registers. When the IDE device 180 was ready to receive data, device 180 would assert INTRQ 249, which would be received by IDE controller 132. IDE controller 132 would perform memory access cycles to retrieve data from memory 135. IDE controller 132 would store the retrieved data in FIFO 270. Next, the IDE controller 132 would perform I/O access cycles to IDE device 180 to transfer the data to device 180. Although not necessary in all embodiments of the invention, upon completion of the I/O access cycles, IDE controller 132 could assert an interrupt to the host processor indicating the transfer was complete.

Thus, DMA and DMA-like transfers can be performed while the host processor is essentially blind to the fact that certain devices are not capable of bus master control. If a DMA transfer is required, it can be performed regardless of the busmastering status of the IDE drive and host processor resources are not wasted. Further, host processor resources can be maximized as data received in memory (i.e., during a read cycle) can begin to be processed by the host processor 120 while the transfer is still taking place.

It should be understood that the particular embodiments described above are only illustrative of the principles of the present invention, and various modifications could be made by those skilled in the art without departing from the scope and spirit of the invention. Thus, the scope of the present invention is limited only by the claims that follow.

What is claimed is:

1. A method of emulating a direct memory access (DMA) mode of operation in a first device interfaced to a second device by an interface unit, wherein said second device includes a processor and a memory, comprising the sequential steps of:

receiving, by said interface unit, an interrupt request from said first device;

generating, by said interface unit, an I/O access cycle to retrieve read data from said first device;

storing, by said interface unit, said read data in a buffer;

transferring, by said interface unit, said read data to said memory;

generating, by said interface unit, an interrupt to said processor; and said steps of generating, storing and transferring occurring without control by said processor.

2. The method of claim 1, further comprising the steps of:

receiving, by said interface unit, a DMA request from a third device;

receiving, by said interface unit, DMA data in said buffer from said third device during a DMA access cycle;

transferring, by said interface unit, said DMA data to said memory; and generating, by said interface unit, an interrupt to said processor.

3. The method of claim 1, further comprising the steps of:

receiving, by said interface unit, an interrupt request from said first device;

retrieving, by said interface unit, write data from said memory;

storing, by said interface unit, said write data in a buffer;

generating, by said interface unit, an I/O access cycle to transfer said write data to said first device.

4. An interface apparatus, comprising:

a first input for receiving an interrupt request signal;

a second input for receiving a direct memory access (DMA) request signal;

DMA means for receiving first data following receipt of said DMA request signal, for transferring said first data to a memory, and for interrupting a processor after said first data has been transferred to said memory;

emulation means for retrieving second data following receipt of an interrupt request signal and without control by said processor, for transferring said second data to a memory without control by said processor, and for interrupting said processor after said second data has been transferred to said memory.

5. The apparatus of claim 4, wherein said emulation means includes:

means for generating an I/O access cycle to an interrupt-request-generating device following receipt of said interrupt request;

storage means for storing data retrieved from said interrupt-request-generating device;

means for generating a memory access cycle to transfer said second data to said memory;

processor-interrupt-generation means for generating an interrupt to a processor after said second data is transferred to said memory.

6. The apparatus of claim 5, wherein said storage means is a FIFO.

7. A system, comprising:

a processor;

a memory;

a peripheral storage unit capable of operating in a programmed I/O (PIO) mode of operation;

interrupt-request-processing means for receiving an interrupt request from said peripheral storage unit, for generating an I/O access cycle to said peripheral storage unit to retrieve data following receipt of said interrupt request and without utilizing resources of said processor, for storing said data, for transferring said data to said memory without utilizing resources of said processor, and for interrupting said processor after said data has been transferred to said memory.

8. The system of claim 7, wherein said interrupt-request-processing means is further for receiving a second interrupt request from said peripheral storage unit, for generating a memory access cycle for retrieving data from said memory following said interrupt request signal, for storing said data, and for generating an I/O access cycle to said peripheral storage unit to transfer said data to said peripheral storage unit.

9. The system of claim 8, further comprising:

a second peripheral storage unit capable of a direct memory access (DMA) mode of operation;

DMA-request-processing means for receiving a DMA request from said second peripheral storage unit, for receiving DMA data from said second peripheral storage unit following said DMA request, for transferring said DMA data to said memory, and for interrupting said processor after said DMA data has been transferred to said memory.

10. A method of emulating a direct memory access (DMA) mode of operation In a first device interfaced to a second device by an interface unit, wherein said second device includes a processor and a memory, comprising the sequential steps of:

receiving, by said interface unit, an interrupt request from said first device;

generating, by said interface unit and without utilization of resources of said processor, an I/O access cycle to retrieve read data from said first device;

transferring, by said interface unit and without utilization of resources of said processor, said read data to said memory; and generating, by said interface unit, an interrupt to said processor.

11. The method of claim 10, further comprising the steps of:

receiving, by said interface unit, a DMA request from a third device;

receiving, by said interface unit, DMA data from said third device during a DMA access cycle;

transferring, by said interface unit, said DMA data to said memory; and generating, by said interface unit, an interrupt to said processor.

12. The method of claim 10, further comprising the steps of:

receiving, by said interface unit, an interrupt request from said first device;

retrieving, by said interface unit, write data from said memory;

generating, by said interface unit, an I/O access cycle to transfer said write data to said first device.

13. A system, comprising:

a processor;

a memory coupled to said processor;

a peripheral device incapable of a DMA mode of operation;

an Interrupt request line coupled to said peripheral device;

a plurality of address/data lines coupled to said peripheral device;

an interface unit coupled to said processor, to said memory, to said interrupt request line, and to said plurality of address/data lines, said interface unit including an I/O access cycle generator, a memory access cycle generator, said interface unit structured to respond to a signal on said interrupt request line, without involvement of said processor, by initiating an I/O access cycle to read information from said peripheral device and then transferring the information to said memory or by initiating a memory access cycle to write information to said peripheral device and then transferring the information to said peripheral device.

* * * * *